US008813859B2

(12) United States Patent
Schlatter

(10) Patent No.: US 8,813,859 B2
(45) Date of Patent: Aug. 26, 2014

(54) FIRE SUPPRESSION VALVE IMPROVEMENTS

(71) Applicant: Sandvik Intellectual Property AB, Sandviken (SE)

(72) Inventor: Heinz Schlatter, Melrose Park (AU)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 13/670,070

(22) Filed: Nov. 6, 2012

(65) Prior Publication Data

US 2013/0068486 A1 Mar. 21, 2013

Related U.S. Application Data

(63) Continuation of application No. 13/473,029, filed on May 16, 2012.

(30) Foreign Application Priority Data

May 20, 2011 (AU) ................................ 2011901982

(51) Int. Cl.

| | |
|---|---|
| ***A62C 35/00*** | (2006.01) |
| ***A62C 37/12*** | (2006.01) |
| ***F16K 15/00*** | (2006.01) |
| ***F16K 17/00*** | (2006.01) |
| ***F16K 21/04*** | (2006.01) |

(52) U.S. Cl.

USPC ............... 169/16; 169/59; 169/8; 137/516.25

(58) Field of Classification Search

USPC ........... 169/16, 7, 8, 9, 11, 71, 74, 76, 59, 42, 169/17; 137/516.25, 518, 521, 523, 78.5, 137/77, 80, 72, 74, 597, 141; 428/34.1, 428/64.1; 277/634

See application file for complete search history.

(56) References Cited

U.S. PATENT DOCUMENTS

| | | | | |
|---|---|---|---|---|
| 1,189,335 | A * | 7/1916 | Anderson | 169/20 |
| 2,595,127 | A * | 4/1952 | Coffey | 264/160 |
| 3,052,304 | A * | 9/1962 | Williamson et al. | 169/11 |
| 3,100,017 | A * | 8/1963 | Johnson | 169/17 |
| 4,648,460 | A * | 3/1987 | McCulloch | 169/57 |
| 5,099,925 | A * | 3/1992 | Glidden et al. | 169/17 |
| 5,188,184 | A * | 2/1993 | Northill | 169/22 |
| 5,236,049 | A * | 8/1993 | Asselin et al. | 169/61 |
| 6,708,771 | B2 * | 3/2004 | Reilly | 169/16 |

* cited by examiner

*Primary Examiner* — Len Tran
*Assistant Examiner* — Chee-Chong Lee
(74) *Attorney, Agent, or Firm* — The Webb Law Firm

(57) ABSTRACT

Disclosed is a fire suppression system, a valve for the system, and a movable valve member for the valve. The system includes a reservoir for a fire suppressant material. The reservoir has an outlet, at least one nozzle from which the suppressant is delivered, and a valve governing passage of the suppressant to the nozzles. The valve includes a movable valve member and first and second valve seats cooperating therewith. The valve member is movable from a first position seated with respect to the first valve seat preventing communication between the reservoir and the nozzles, to a second position seated with respect to the second valve seat permitting suppressant flow from the reservoir to the nozzles and preventing suppressant flow to an actuator operatively associated with the valve to selectively cause movement of the valve member from the first position to the second position.

8 Claims, 10 Drawing Sheets

FIRE SUPPRESSION VALVE IMPROVEMENTS

PRIORITY

This patent application claims priority from Australian Provisional Patent Application 2011901982, titled "FIRE SUPPRESSION VALVE IMPROVEMENTS", and filed on 20 May 2011. The entire content of this application is hereby incorporated herein by reference.

FIELD OF THE INVENTION

This invention relates to a fire suppression system of the type which, for example, is employed in stationary plant, heavy diesel powered plant such as mining equipment and vehicles of that nature, but need not be so limited in application.

BACKGROUND OF THE INVENTION

It is an object of the invention to provide a useful alternative to known fire suppression systems, and/or control valves for these systems.

Other objects and advantages of the present invention will become apparent from the following description, taken in connection with the accompanying drawings, wherein, by way of illustration and example, an embodiment of the present invention is disclosed.

SUMMARY OF THE INVENTION

In one aspect, the invention may be said to reside in a fire suppression system comprising a reservoir to contain a fire suppressant material, said reservoir having an outlet, at least one nozzle from which the suppressant is delivered, and a valve governing passage of the suppressant to the nozzles, said valve comprising a movable valve member and first and second valve seats cooperating therewith, said valve member being movable from a first position seated with respect to said first valve seat preventing communication between said reservoir and said at least one nozzle, to a second position seated with respect to said second valve seat permitting the flow of said suppressant material from said reservoir to said at least one nozzle and preventing suppressant flow to an actuator operatively associated with said valve to selectively cause movement of said valve member from said first position to said second position.

In a further aspect, the invention may be said to reside in a valve for a fire suppression system comprising a reservoir to contain a fire suppressant material, said reservoir having an outlet, at least one nozzle from which the suppressant is delivered, wherein said valve governs passage of the suppressant to the nozzles and comprises a movable valve member and first and second valve seats cooperating therewith, said valve member being movable from a first position seated with respect to said first valve seat preventing communication between said reservoir and said at least one nozzle, to a second position seated with respect to said second valve seat thereby permitting the flow of said suppressant material from said reservoir to said at least one nozzle and preventing suppressant flow to an actuator operatively associated with said valve to selectively cause movement of said valve member from said first position to said second position.

In one form, said actuator maintains a fluid or gas under pressure to position said valve member in said first position, said actuator being operable to vent said fluid or gas and permit said valve member to move to said second position.

In one form, the movable valve member comprises a diaphragm having opposing sides, and a sealing member on both sides, thereby permitting sealing of the movable valve member against either of the first or second valve seats.

In one form, the sealing members are substantially identical.

In one form, the diaphragm is dished, and this dishing is reversible via inversion, permitting dual action of the movable valve member.

In one form, the natural extent of movement of the sealing element during inversion of dishing is greater than the distance between the first and second valve seats so that the diaphragm holds the sealing element against either of the first or second annular valve seats with a degree of force that is independent of fluid pressure, be this fluid liquid or gas.

In a further aspect, the invention may be said to reside in a movable valve member for a valve of a fire suppression system, the movable valve member comprising a diaphragm of elastomeric material substantially encapsulating a sheet of reinforcing material.

In one form, the diaphragm of elastomeric material further substantially encapsulates at least one form providing insert.

In one form, wherein the movable valve member comprises a central body portion and a flexible but strong flange extending outwardly from and around the central body portion.

In one form, opposing sides of the circular body portion of the movable valve member provide oppositely directed sealing surfaces for sealing the movable valve member 1 against either of the first or second annular valve seats.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

BRIEF DESCRIPTION OF THE DRAWINGS

For a better understanding of this disclosure it will now be described with respect to one or more exemplary embodiments, which shall be described herein with the assistance of drawings wherein.

In the following description, like reference characters designate like or corresponding parts throughout the several views of the drawings.

DESCRIPTION OF A PREFERRED EMBODIMENT

Figure 1:
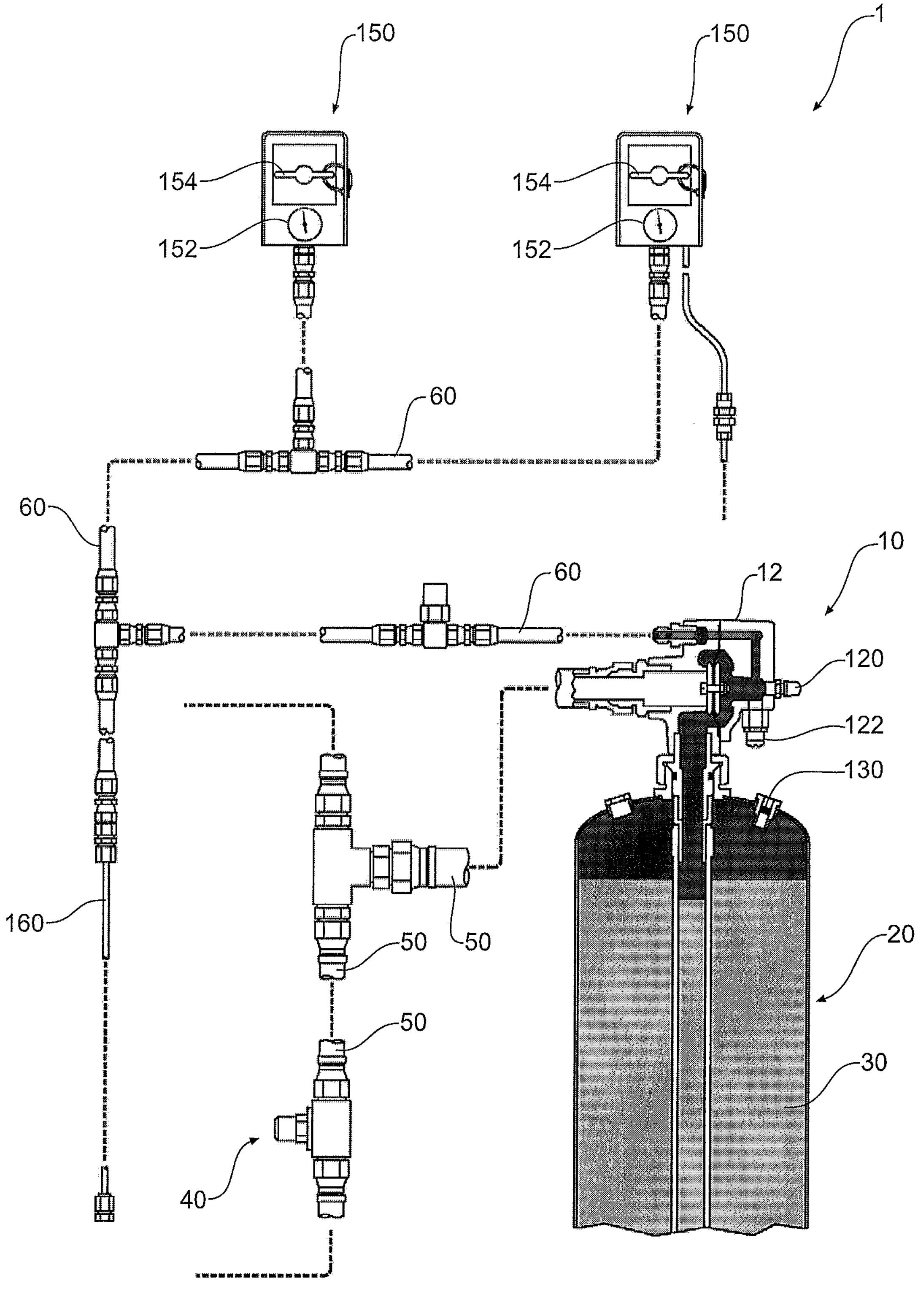
FIG. 1 is a schematic illustration of a fire suppression system when charged (ie. on stand-by)

Referring now to FIG. 1, where there is illustrated a fire suppression system 1. The system 1 includes a storage tank (or reservoir) 20 containing a liquid fire extinguishing agent (or suppressant material) 30 which is delivered to the nozzles 40 in the case of fire. Passage of the agent 30 to the nozzles 40 is governed by a valve assembly 10, where the valve assembly 10 is connected to the nozzles 40 by means of conduit 50, and the valve assembly 10 is activated when required by release of stored pressure from activation lines 60.

Figure 2:
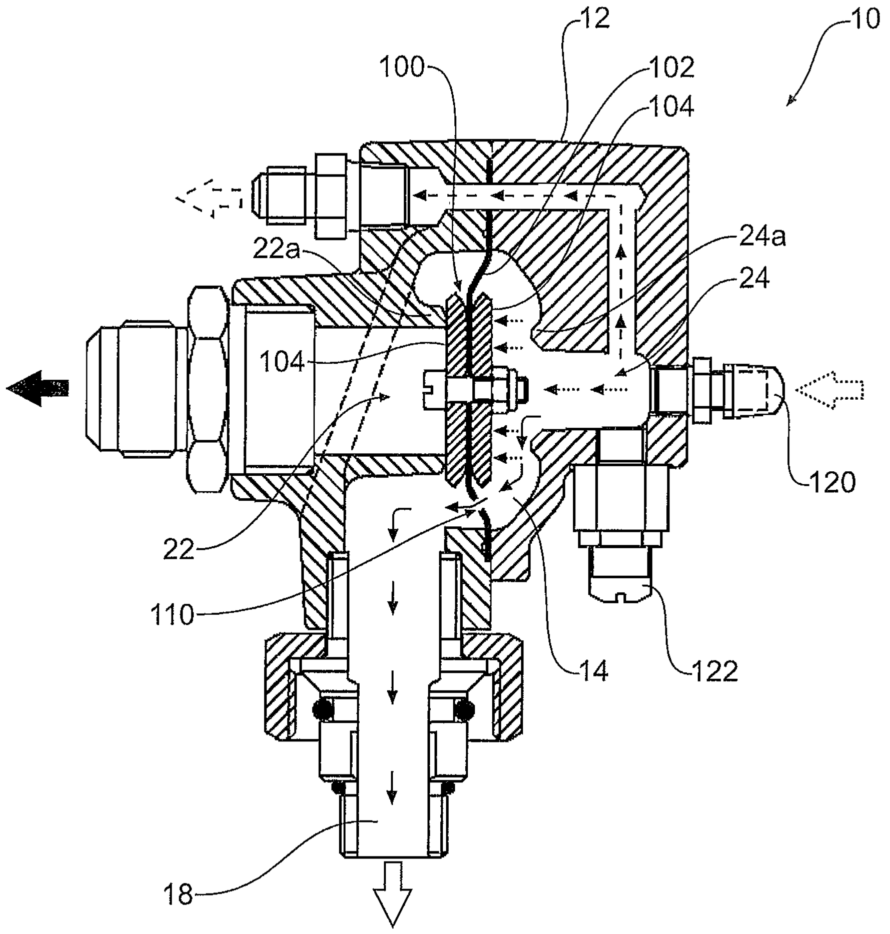
FIG. 2 is a cross-sectional view through a control valve of the charged fire suppression system illustrated in FIG. 1.

With reference to FIG. 2 it can be seen that the valve assembly 10 includes a valve housing 12 defining a valve chamber 14 in which a movable valve member 100 is located.

The valve housing 12 further defines a valve chamber inlet 18 for suppressant 30 received from the storage tank 20 and a valve chamber outlet 22 for suppressant 30 discharged from the valve 10, and a valve chamber port 24 for nitrogen gas in the pressurised activation lines 60.

The valve chamber outlet 22 and activation port 24 are oppositely directed, and the valve chamber outlet 22 defines a first annular valve seat 22*a*, and the activation port 24 defines a second annular valve seat 24*a*.

Figure 4:
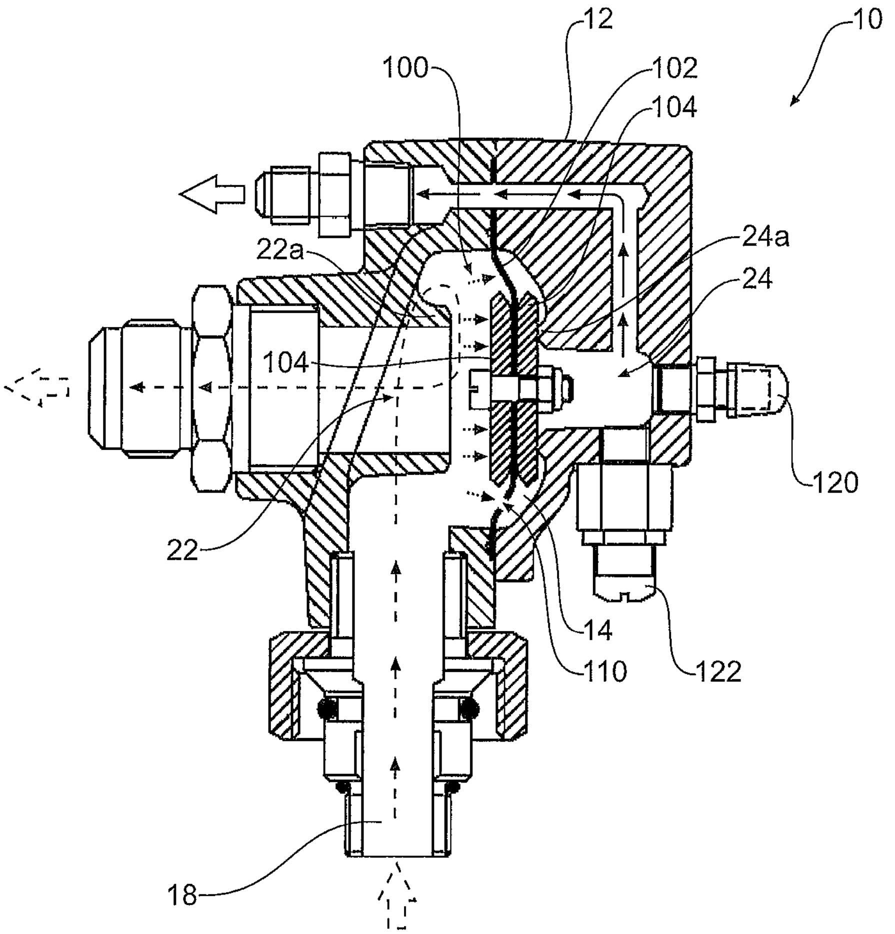
FIG. 4 is a cross-sectional view through the control valve of the discharging fire suppression system illustrated in FIG. 3.

In this preferred embodiment, a movable valve member 100 comprises a diaphragm 102 having opposing sides, and fitted with a sealing element 104 in the form of valve disc on both sides directly adjacent to the diaphragm 102. The diaphragm 102 has a preformed dished shape which is formed in such a way that this dishing is reversible (compare diaphragm 102 in FIGS. 2 and 4), so that sealing of the movable valve member 100 against either of the first or second annular valve seats 22*a* or 24*a* is possible. The dishing can be inverted from one side of the diaphragm 102 to the other, and the movable valve member 100 is stable in both positions (i.e. it is bistable). The application of sufficient pressure to the convex side of the diaphragm 102 causes it to invert or 'toggle' to the other position, so that the convex side become concave. The natural extent of movement of the sealing element 104 during inversion is greater than the distance between the valve seats 22*a* and 24*a*, so that the diaphragm 102 holds the sealing element 104 against either of the first or second annular valve seats 22*a* or 24*a* with a degree of force. In other words, seating of the movable valve member 100 against either of the first or second annular valve seats 22*a* or 24*a* is not dependent on pressure being applied to the diaphragm 102.

The two sealing elements 104 may be identical and formed to or integral with diaphragm 102, eliminating the possibility for incorrect assembly of the movable valve member 100.

The pressurised activation lines 60 comprise one or more activation devices 150, 160 connected to the activation port 24 of the valve housing 12 by means of the conduit.

Once the system 1 has been assembled, the activation lines 60 are charged with nitrogen (ie. the system 1 is pressurised) via a charging connection 120 to the valve body 12. Excessive pressurisation of the activation lines 60 is prevented by a relief valve 122. The pressure applied to the diaphragm 102 by the nitrogen under pressure, positions the movable valve member 100 in sealing contact with the first annular valve seat 22*a*, preventing suppressant flow from the storage tank 20 to the valve chamber outlet 22 of the valve chamber 14.

The tank 20 is pressurised at the same time as the activation lines 60 by way of the nitrogen passing through a small aperture 110 in the diaphragm 102 of the movable valve member 100 and being forced down a flexible siphon tube which is weighted at its end (so that the tank can be mounted at an angle ranging between vertical and near horizontal and the siphon tube will find the lowest point in the tank 20), and into the tank 20 to pressurise the ullage above the suppressant 30. As the tank 20 volume is larger than the volume of the activation lines 60, the activation lines 60 will fully charge before the tank 20. Excessive pressurisation of the tank 20 is prevented by a tank pressure relief valve 130.

The pressure of nitrogen gas on either side of the diaphragm 102 is continually equalised by the small aperture 110 in the diaphragm 102 of the movable valve member 100. This ability to 'self equalise' permits pressure variation in the system such as may result from changes in temperature or minor leaks, without the nitrogen applying any significant load to the diaphragm 102 whilst the system 1 is on standby (ie. charged), as illustrated in FIG. 1. FIG. 1 depicts suppressant in the siphon tube. Suppressant level in the siphon tube will rise and fall as a result of pressure equalisation.

Accordingly, on completion of charging, the pressure in the tank 20 and the activation lines 60 will equalise leaving no physical load on the diaphragm 102 of the movable valve member 100.

Figure 3:
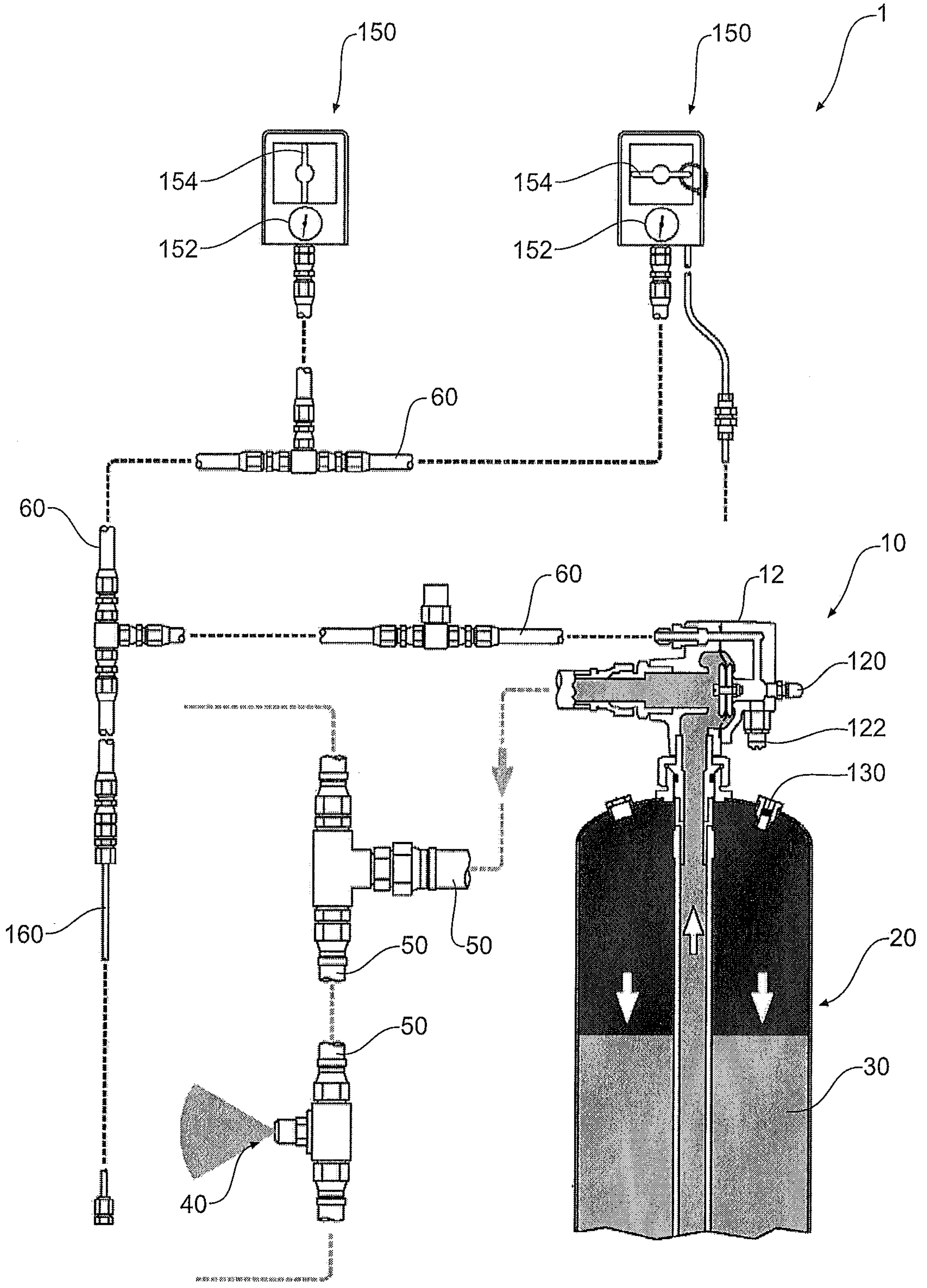
FIG. 3 is a schematic illustration of the fire suppression system in FIG. 1 when discharging.

The activation devices 150, 160 function is to selectively vent the nitrogen in the pressurised activation lines 60 to atmosphere. When the nitrogen is vented to atmosphere it is exhausted from the valve chamber 14 via the activation port 24 creating a pressure drop in the nitrogen on the activation port 24 side of the diaphragm 102 which creates a pressure differential that permits the movable valve member 100 to be moved (by inversion of the dished diaphragm 102) from its sealing position against the first valve seat 22*a* to a sealing position against the second valve seat 24*a*. When the movable valve member 100 is un-seated with respect to its first valve seat 22*a* the suppressant 30 from the tank 20 can flow to the valve chamber outlet 22 of the valve chamber 14 and on to the nozzles 40, as illustrated in FIG. 3.

A very small amount of gas or suppressant 30 (depending on the suppressant level in the siphon tube) is lost through the small aperture 110 in the diaphragm 102 and to the activation lines 60 when the movable valve member 100 is un-seated from its first valve seat 22*a* and before it is seated with respect to its second valve seat 24*a*.

Once the movable valve member 100 is seated with respect to its second valve seat 24*a* the suppressant from the tank 20 is prevented from escaping via the activation lines 60. This means that no check valve need be used in conjunction with valve assembly 10, as is the case in preceding systems.

Activation device 150 is manually operated and includes a gauge 152 to provide an indication of the pressure of the nitrogen in the pressurised activation lines 60. Downstream of the gauge 152 is a manually operated valve which connects to an outlet. The operator by manipulation of the rotary switch 154 vents the nitrogen to atmosphere.

Actuation device 160 is a synthetic tube which if subjected to fire melts and vents the nitrogen to atmosphere.

Figure 5:
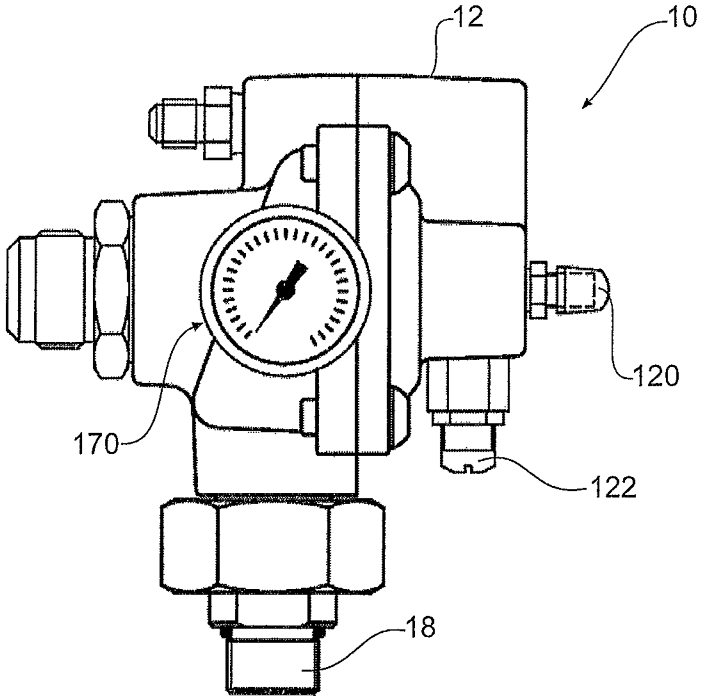
FIG. 5 is a front side view of the control valve of the discharging fire suppression system.
Figure 6:
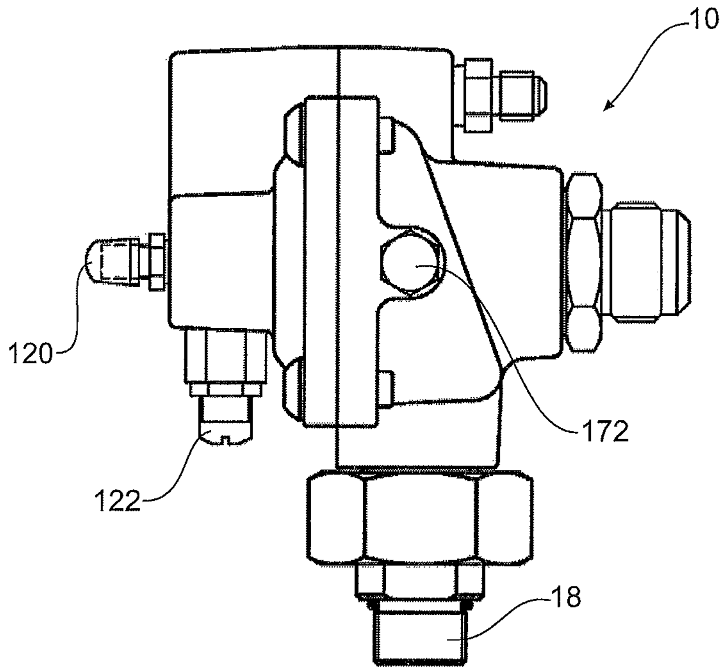
FIG. 6 is a rear side view of the control valve of the discharging fire suppression system.

Referring now to FIG. 5, where there is illustrated a pressure gauge 170 mounted on the valve assembly 10 which senses pressure on the tank 20 side of the diaphragm assembly 100 and indicates this pressure during charging, and inspection or servicing. There is a port 172 (see FIG. 6) on the opposite side of the valve assembly 10 (which is plugged when unused), via which the pressure gauge 170 can be connected to this side of the valve assembly 10. Which side is selected for mounting of pressure gauge 170 depends on the required installation direction of conduit 50.

When the nitrogen is released from the pressurised activation lines 60 (activation), the activation circuit pressure gauges 152 will indicate rapidly falling pressure and read zero in less than one second.

The valve assembly pressure gauge 170 however will indicate the declining pressure of the extinguishing agent passing through the valve assembly 10, eventually reading zero when the discharge of the tank 20 is completed.

If a system 1 appears to be discharged according to the activation circuit pressure gauges 152 (ie. reading zero) but valve assembly pressure gauge 170 indicates a constant pressure (ie. indicated pressure is not declining), then this would then indicate a blocked discharge line, ie that the valve is "open", but is not discharging (or has only partially discharged).

Fire suppression system 1 can comprise multiple valve assembly 10 equipped storage tanks 20, all of which are activated by common activation lines 60 and activation devices 150, 160, so that if any one activation device is triggered and begins venting the nitrogen from the activation lines 60, all valve assemblies 10 are activated and all tanks 20 emptied.

FIGS. 7 through 13 illustrate an additional embodiment of the invention. Since most of the parts of the fire suppression system 1A shown in these Figures are identical to corresponding parts shown in the fire suppression system 1 shown in FIG. 1, they are denoted by the same reference numerals and will not be described again in detail.

Whilst it functions like movable valve member 100 of fire suppression system 1, it is the movable valve member 100A of fire suppression system 1A that differs most materially.

Figure 7:
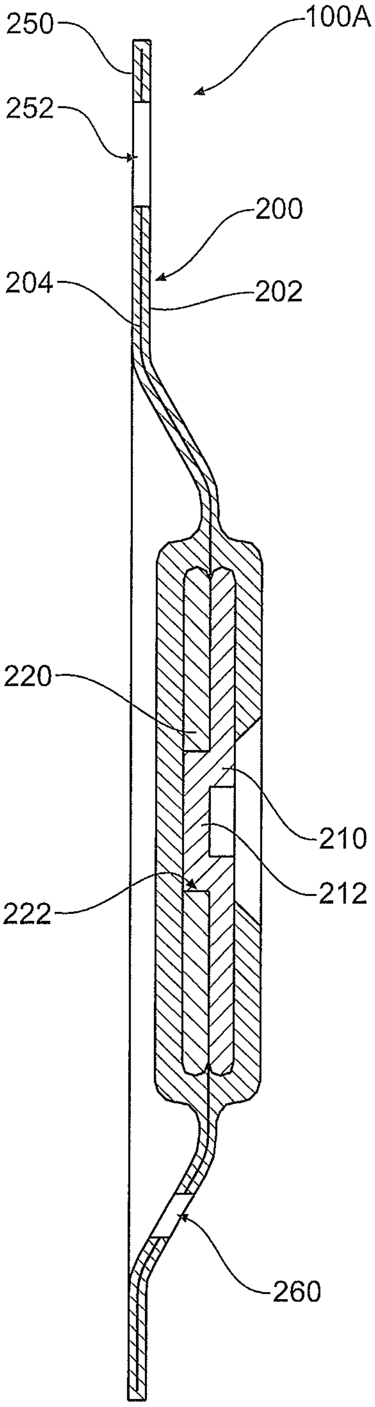
FIG. 7 is a sectional view through a further embodiment of a movable valve member for the valve of the fire suppression system.
Figure 8:
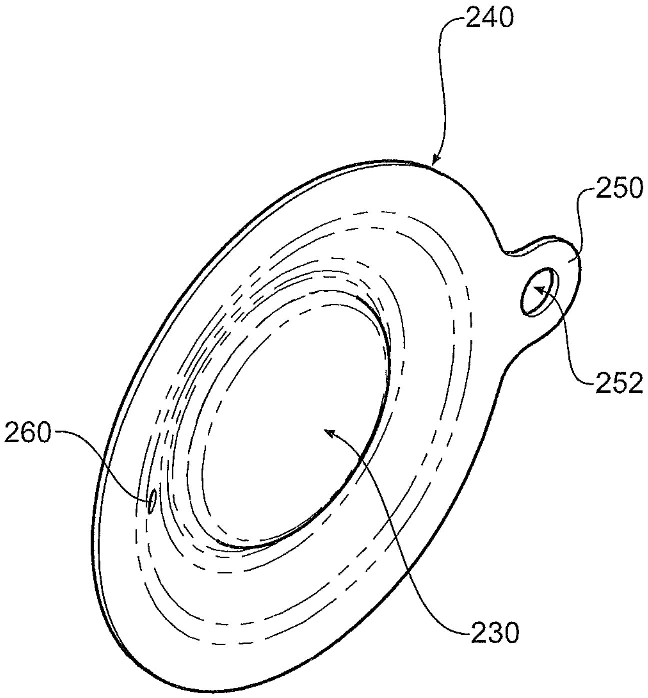
FIG. 8 is a perspective view of the movable valve member of FIG. 7.
Figure 9:
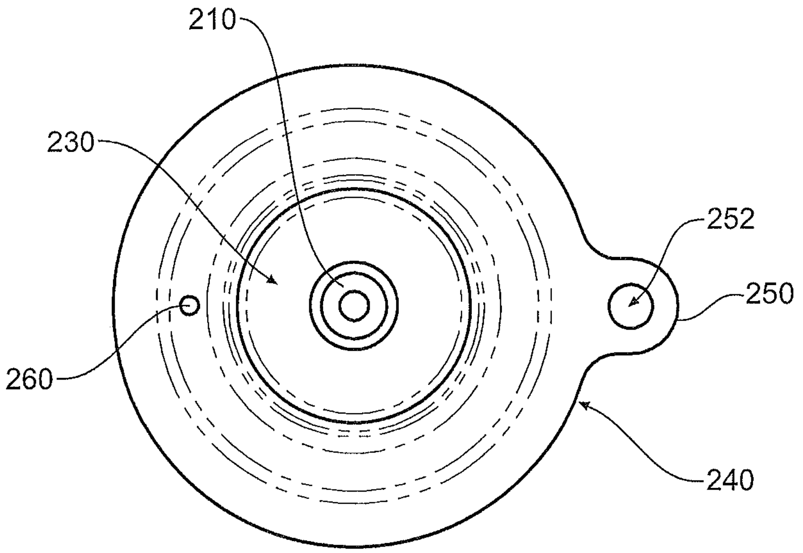
FIG. 9 is a plan view of the movable valve member of FIGS. 7 and 8.
Figure 10:
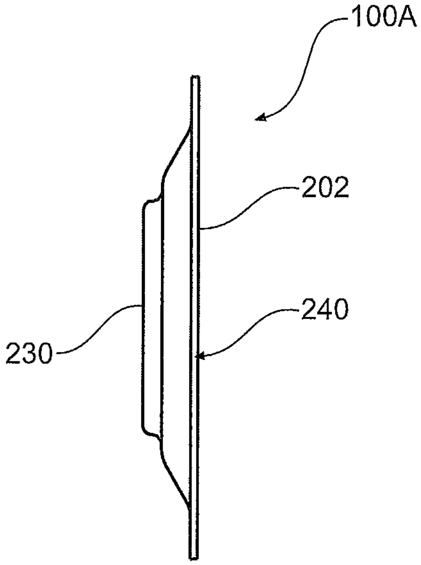
FIG. 10 is side view of the movable valve member of FIGS. 7 through 9.
Figure 11:
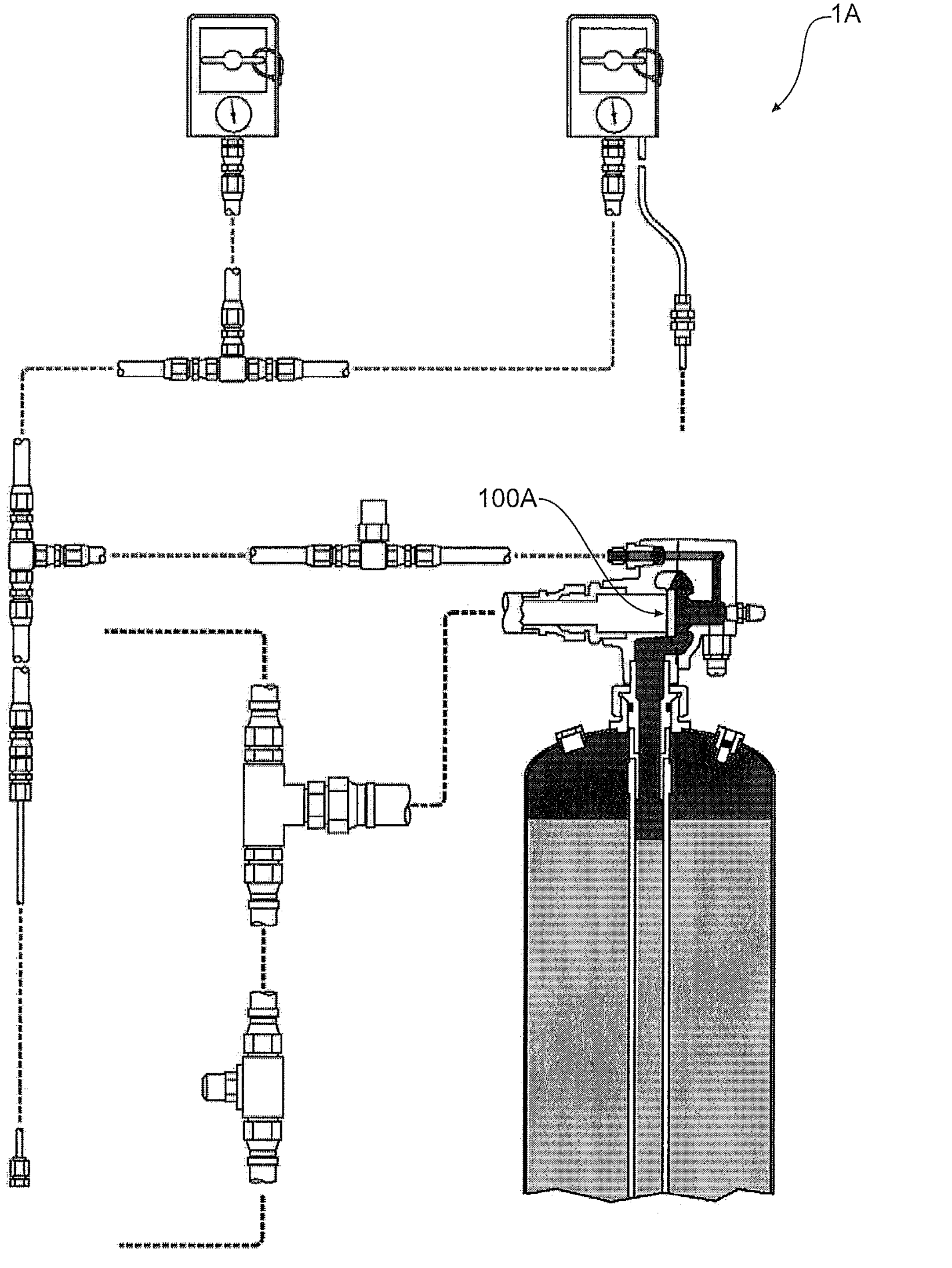
FIG. 11 is a schematic illustration of a fire suppression system comprising the movable valve member of FIGS. 7 through 10, when charged.
Figure 12:
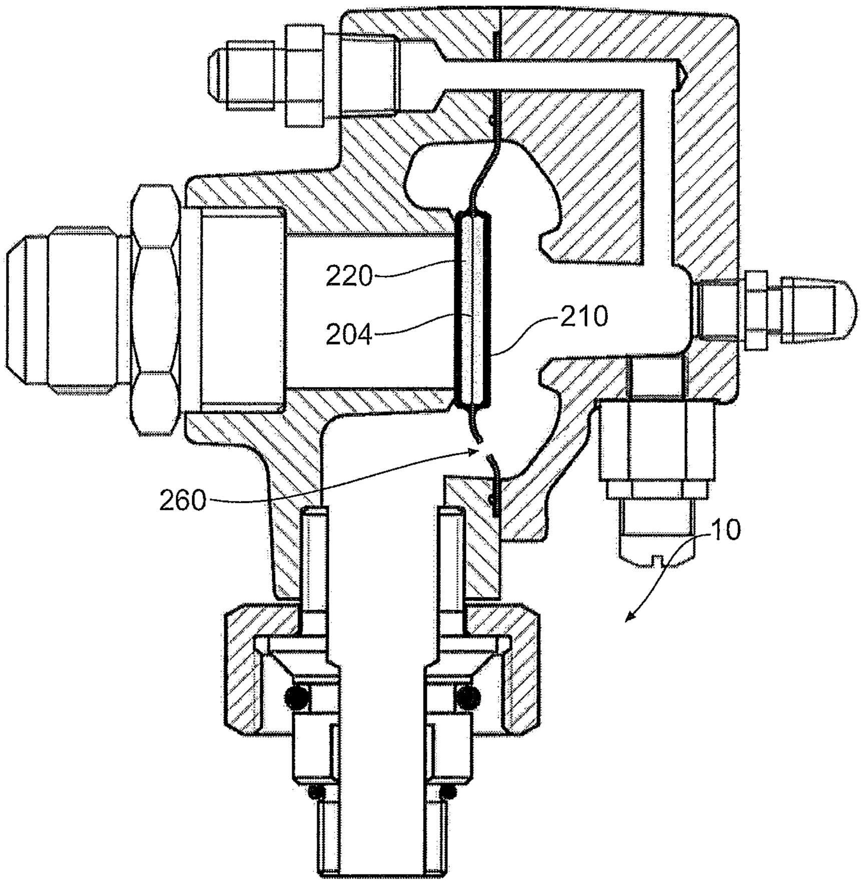
FIG. 12 is a cross-sectional view through a control valve of the charged fire suppression system illustrated in FIG. 11.
Figure 13:
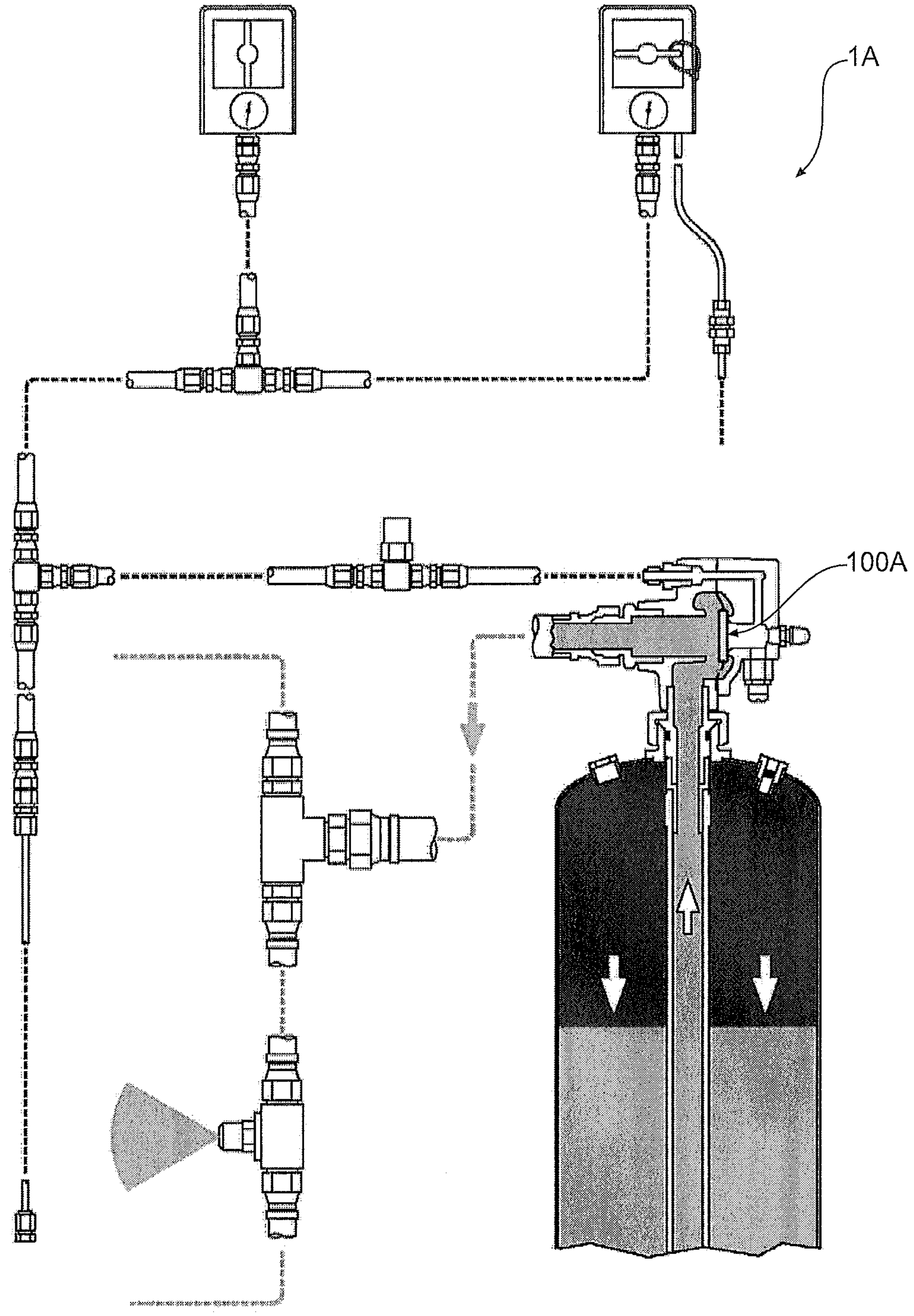
FIG. 13 is a schematic illustration of the fire suppression system in FIGS. 11 and 12 when discharging.

Referring now to FIG. 7, where it can be seen how in fire suppression system 1A, movable valve member 100A is a diaphragm 200 of elastomeric material 202 almost completely encapsulating a sheet of reinforcing material 204, which extends through the elastomeric material 202 to give strength to the movable valve member 100A.

The diaphragm 200 of elastomeric material further encapsulates a pair of rigid disc shaped inserts 210 and 220 which sandwich the sheet of reinforcing material 204 between them in a central region of the reinforcing sheet 204. The two inserts 210 and 220 engage by means of disc 210 being embossed with an outwardly protruding circular form (hereinafter circular boss) 212, and the other disc comprising a through hole 222 sized to receive the circular boss 212. The sandwiched reinforcing sheet 204 similarly comprises a through hole (not visible) to accommodate the circular boss 212.

As a result of this construction, the movable valve member 100A comprises a relatively rigid, centralised circular body portion 230 and a flexible but strong outwardly extending concentric flange 240.

The two sides of the circular body portion 230 of the movable valve member 100A provide oppositely directed sealing surfaces for sealing the movable valve member 100A against either of the first or second annular valve seats 22*a* or 24*a*.

Accordingly, the disc inserts 210 and 220 provide form for this circular body portion 230 and the sealing surfaces provided thereby, and prevent shearing action (ie. movement along the plane of contact) between the reinforcing sheet 204 and its elastomeric coating 202.

In this exemplary embodiment the elastomeric material is (but is not limited to) a Nitrile rubber, the sheet of reinforcing material 204 is (but is not limited to) a polyester fabric and the rigid discs 210 and 220 are (but are not limited to) brass inserts with rounded external edges.

A tab 250 having an aperture 252 therethrough extends from the diaphragm and provides a seal around a passageway extending to one of the pressure activation lines 60 and across a join line between the two valve housing 12 halves.

As with movable valve member 100, the diaphragm 200 has a preformed dished shape which is formed in such a way that this dishing is reversible (compare FIGS. 11 and 13), so that sealing of the movable valve member 100A against either of the first or second annular valve seats 22*a* or 24*a* is possible. The dishing can be inverted from one side of the diaphragm 200 to the other, and the movable valve member 100A is stable in both positions (ie. it is bistable). The application of sufficient pressure to the convex side of the diaphragm 200 causes it to invert or 'toggle' to the other position, so that the convex side become concave.

As before, the pressure of nitrogen gas on either side of the diaphragm 200 is continually equalised by the small aperture 260 through the flexible portion of the movable valve member 100A.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications in its scope.

The claims defining the invention are as follows:

1. A fire suppression system comprising a reservoir to contain a fire suppressant material, said reservoir having an outlet, at least one nozzle from which the suppressant material is delivered, and a valve governing passage of the suppressant material to said at least one nozzle, said valve comprising a movable valve member and first and second valve seats cooperating therewith, said movable valve member being movable from a first position seated with respect to said first valve seat preventing communication between said reservoir and said at least one nozzle, to a second position seated with respect to said second valve seat permitting the flow of said suppressant material from said reservoir to said at least one nozzle and preventing suppressant material flow to an actuator operatively associated with said valve to selectively cause movement of said movable valve member from said first position to said second position;

wherein the movable valve member comprises a diaphragm having opposing sides, and a sealing means on both sides directly adjacent to the diaphragm, thereby permitting sealing of the movable valve member against either of the first or second valve seats; and wherein said actuator maintains a fluid or gas under pressure against one side of said movable valve member to position said movable valve member in said first position, said actuator being operable to vent said fluid or gas and permit pressure applied against the other side of said movable valve member to move said movable valve member to said second position.

2. The fire suppression system as in claim 1, wherein the diaphragm is dished, and this dishing is reversible via inversion, permitting dual action of the movable valve member.

3. The fire suppression system of claim 2, wherein the natural extent of movement of the movable valve member during inversion of dishing is greater than the distance between the first and second valve seats so that the diaphragm holds the sealing means against either of the first or second valve seats with a degree of force that is independent of fluid pressure, be this fluid liquid or gas.

4. The fire suppression system of claim 1, wherein the diaphragm of the movable valve member comprises an elastomeric material which substantially encapsulates a sheet of reinforcing material.

5. The fire suppression system of claim 4, wherein the diaphragm of elastomeric material further substantially encapsulates at least one form providing insert.

6. The fire suppression system of claim 1, wherein the movable valve member comprises a central body portion and a flexible but strong flange extending outwardly from and around the central body portion.

7. The fire suppression system of claim 6, wherein the central body portion is circular and opposing sides of the circular body portion of the movable valve member provide oppositely directed sealing surfaces for sealing the movable valve member against either of the first or second valve seats.

8. A valve for a fire suppression system, wherein the fire suppression system has a reservoir to contain a fire suppressant material, said reservoir having an outlet, at least one nozzle from which the suppressant material is delivered, wherein said valve governs passage of the suppressant material to said at least one nozzle, and wherein said valve comprises a movable valve member and first and second valve seats cooperating therewith, said movable valve member being movable from a first position seated with respect to said first valve seat preventing communication between said reservoir and said at least one nozzle, to a second position seated with respect to said second valve seat thereby permitting the flow of said suppressant material from said reservoir to said at least one nozzle and preventing suppressant material flow to an actuator operatively associated with said valve to selectively cause movement of said movable valve member from said first position to said second position, wherein the movable valve member comprises a diaphragm having opposing sides and a sealing means on both sides directly adjacent to the diaphragm, thereby permitting sealing of the movable valve member against either of the first or second valve seats; and wherein said actuator maintains a fluid or gas under pressure against one side of said movable valve member to position said movable valve member in said first position, said actuator being operable to vent said fluid or gas and permit pressure applied against the other side of said movable valve member to move said movable valve member to said second position.

* * * * *